United States Patent
Reinpoldt, III (10) Patent No.: US 12,008,829 B2
(45) Date of Patent: Jun. 11, 2024

(54) SYSTEM AND METHOD FOR IMPROVED OCR EFFICACY THROUGH IMAGE SEGMENTATION

(71) Applicant: VASTEC, INC., Tampa, FL (US)

(72) Inventor: Willem H. Reinpoldt, III, Tarpon Springs, FL (US)

(73) Assignee: VASTEC, INC., Tampa, FL (US)

( * ) Notice: Subject to any disclaimer, the term of this patent is extended or adjusted under 35 U.S.C. 154(b) by 148 days.

(21) Appl. No.: 17/672,944

(22) Filed: Feb. 16, 2022

(65) Prior Publication Data
US 2023/0260308 A1   Aug. 17, 2023

(51) Int. Cl.
G06V 30/414   (2022.01)
G06V 30/146   (2022.01)
G06V 30/148   (2022.01)
G06V 30/412   (2022.01)

(52) U.S. Cl.
CPC .......... *G06V 30/414* (2022.01); *G06V 30/146* (2022.01); *G06V 30/158* (2022.01); *G06V 30/412* (2022.01)

(58) Field of Classification Search
CPC ............... G06V 30/40–43; G06V 30/148–158
See application file for complete search history.

(56) References Cited

U.S. PATENT DOCUMENTS

| | | | |
|---|---|---|---|
| 4,558,461 A | 12/1985 | Schlang | |
| 5,392,130 A | 2/1995 | Mahoney | |
| 6,046,740 A | 4/2000 | Laroche et al. | |
| 9,063,911 B2 | 6/2015 | Levy et al. | |
| 9,165,186 B1* | 10/2015 | Ramos | G06V 30/413 |
| 2003/0097384 A1 | 5/2003 | Hu et al. | |
| 2006/0209333 A1 | 9/2006 | Takida | |
| 2008/0107337 A1 | 5/2008 | Furmaniak et al. | |
| 2008/0317337 A1* | 12/2008 | Wang | G06V 30/416 382/165 |
| 2009/0060336 A1* | 3/2009 | Konno | G06V 30/414 382/177 |
| 2009/0086275 A1* | 4/2009 | Liang | G06V 10/25 358/3.21 |
| 2009/0144614 A1* | 6/2009 | Dresevic | G06F 40/137 715/239 |
| 2009/0316219 A1* | 12/2009 | Ohashi | G06V 30/412 358/450 |

(Continued)

*Primary Examiner* — Sean T Motsinger
(74) *Attorney, Agent, or Firm* — ALLEN, DYER ET AL.

(57) ABSTRACT

A method to improve the efficacy of optical character recognition (OCR) includes scanning an electronically stored representation of a whole or partial document, identifying an image having text in the electronically stored representation of a whole or partial document, identifying the text within the image, and generating a plurality of bounding boxes around the identified text using blob detection. The method also includes grouping together certain text bounding boxes of the plurality of text bounding boxes that are vertically aligned with each other to generate a plurality of aligned text bounding boxes and performing OCR on the aligned text bounding boxes to generate a plurality of OCR groups of text. In addition, the method includes generating a resultant representation of a whole or partial document electronically using the plurality of OCR groups of text and saving the resultant representation of a whole or partial document electronically.

12 Claims, 8 Drawing Sheets

(56) References Cited

U.S. PATENT DOCUMENTS

| | | |
|---|---|---|
| 2010/0054585 A1 | 3/2010 | Guillou et al. |
| 2010/0057434 A1* | 3/2010 | Konno .................. G06V 30/40 |
| | | 382/185 |
| 2010/0174985 A1 | 7/2010 | Levy et al. |
| 2010/0303356 A1 | 12/2010 | Fosseide et al. |
| 2011/0188745 A1* | 8/2011 | Morita ................ G06V 30/412 |
| | | 382/165 |
| 2011/0271177 A1 | 11/2011 | Bastos Dos Santos et al. |
| 2012/0045131 A1* | 2/2012 | He ...................... G06V 30/412 |
| | | 382/190 |
| 2012/0177295 A1 | 7/2012 | Gronau et al. |
| 2012/0179468 A1 | 7/2012 | Nestares |
| 2013/0177246 A1* | 7/2013 | Stokes ................ G06V 30/413 |
| | | 382/182 |
| 2013/0259314 A1 | 10/2013 | Kozitsky et al. |
| 2014/0013215 A1* | 1/2014 | Sesum ................ G06V 30/414 |
| | | 715/247 |
| 2014/0192210 A1* | 7/2014 | Gervautz .................. G06T 7/74 |
| | | 348/207.1 |
| 2015/0066895 A1 | 3/2015 | Komissarchik et al. |
| 2015/0138220 A1 | 5/2015 | Chapman et al. |
| 2016/0179764 A1 | 6/2016 | Kelso et al. |
| 2016/0188541 A1* | 6/2016 | Chulinin ............... G06F 40/295 |
| | | 704/8 |
| 2016/0203625 A1 | 7/2016 | Khan et al. |
| 2017/0154232 A1 | 6/2017 | Hammen |
| 2017/0220989 A1 | 8/2017 | King |
| 2017/0372156 A1 | 12/2017 | Kalenkov et al. |
| 2018/0217973 A1* | 8/2018 | Gopalakrishnan ... G06V 30/414 |
| 2018/0276462 A1 | 9/2018 | Davis et al. |
| 2019/0057253 A1* | 2/2019 | Tatsumi ................ G06V 30/414 |
| 2019/0065882 A1* | 2/2019 | Reinpoldt, III ...... G06V 30/412 |
| 2021/0034856 A1* | 2/2021 | Torres .................. G06V 30/414 |
| 2021/0286991 A1* | 9/2021 | Miyauchi ................ G06F 18/22 |
| 2022/0318224 A1* | 10/2022 | Thompson ........... G06V 30/413 |
| 2023/0186592 A1* | 6/2023 | Mikhonov ........... G06V 30/413 |
| | | 382/164 |

\* cited by examiner

AFFIDAVIT - IMPORTANT—The execu-
the facts stated therein,
cal of a corporation or

AFFIDAVIT - IMPORTANT—The execu-
the facts stated therein,
cal of a corporation or

FIG. 4b 420
421
422

AFFIDAVIT - IMPORTANT—The execu-
the facts stated therein,
cal of a corporation or

AFFIDAVIT - IMPORTANT—The execu- — 431
the facts stated therein, — 432
cal of a corporation or — 433

SYSTEM AND METHOD FOR IMPROVED OCR EFFICACY THROUGH IMAGE SEGMENTATION

TECHNICAL FIELD

The present invention relates to the field of Optical Character Recognition (OCR), and in particular to a method for improving the efficacy of OCR software through image segmentation of unaligned non-raster characters during image preprocessing.

BACKGROUND

Optical Character Recognition (OCR) software was introduced in the 1970's and involves the conversion of scanned images of printed or typewritten text into computer-readable text using computer software and algorithms. Early OCR software operated in a single zone, full page mode where the entire page was scanned and converted at once. Contemporary OCR software can optionally operate using multiple zones for a single page, allowing only specific zones of a page to be scanned and converted and the remainder of the page will not be.

Image preprocessing is often a desirable step before OCR. With an image preprocessing step, the image can be optimized prior to OCR so as to improve OCR efficacy. Typical image preprocessing operations include de-speckle, which removes extraneous noise from the image, de-skew, which straightens tilted images, and binarization, which converts the image from color or gray scale to a black-and-white "binary" or "bi-tonal" image.

OCR software algorithms typically scan images using successive horizontal scans similar to a fax machine scanning a page or an ink-jet printer printing a page to convert image-based text into characters. Each horizontal scan of the width of the page is termed a raster and OCR software will aggregate and analyze rasters from the top of the page to the bottom of the page. Margins and vertical white space (leading) are ignored until a raster containing valid image data (often black text pixels against white background pixels) are detected. Character recognition then begins assembling rows of pixels representing text by accumulating subsequent rasters vertically until vertical white space/leading is again detected indicating a line or "row" of text has been found and the accumulated pixel data is ready for character-by-character processing of the row of text.

The recognition process traverses the row of text, segmenting the row into individual blobs of connected black pixels separated by white space. These blobs of connected black pixels are candidates for character recognition. For each blob of connected black pixels that is recognized as containing a character by the OCR software, various information is collected such as the alphabet letter, the point-size and other font characteristics of the character, the confidence percentage of the recognition, and the bounding rectangle containing the character.

Ideally, the rows of text in the image are neatly aligned so that any particular raster bisects text uniformly within the row. For example, a raster scanning horizontally might bisect text at its baseline, or at the middle of the character heights, or at the top of the characters consistently along the line of text. In this case, the text within the row is considered vertically aligned.

OCR software which scans using the raster approach can experience difficulty with non-aligned text within the same row causing erroneous OCR results. This can occur if there is an absence of consistent white space marking the top and bottom of a line of text in the row and the raster can be fractured. Sophisticated algorithms could be conceivably designed as part of the OCR software to accommodate non-vertically aligned text rows, but not all commercially available OCR software packages have implemented these algorithms, and such remediation would necessarily require new software releases.

Non-vertically aligned row-based text is often observed in forms documents, spreadsheets, tabular data and documents containing mixed fonts and font sizes. These document types may or may not contain graphical cell borders delineating the edges of one or more cells. These documents are often generated on computers having the ability to mix fonts, font sizes and to justify text vertically.

In some cases, text within rows of the image are not neatly aligned, and a raster might bisect different characters at different heights since the character placement within the row varies. Such is the case in Example 1 below where a raster might bisect adjacent characters at differing heights. In this case, the text is considered not vertically aligned.

The $^{quick}$ brown $_{fox}$ jumps $^{over}$ the $_{lazy}$ dog   Example 1

Similarly, such is the case in Example 2 where a raster might bisect adjacent characters of differing point sizes. In this case, the text is again considered not vertically aligned.

| Notice | This is a Hurricane warning | IRMA |

Example 2

Similarly for example, a document may contain superscript and/or subscript characters of differing heights, fonts, and/or font sizes compared to the surrounding text characters which complicates raster-based OCR software and leads to decreased efficacy, as illustrated in Example 3.

$E_{Universe} = MC^2$   Example 3

Also, for example, a document produced on a legacy manual typewriter may produce document images containing letter shift due to misaligned character hammers striking the paper. In this case, each occurrence of a character produced by a misaligned hammer would appear misaligned on the page, resulting in non-raster vertical alignment and an increased probability of OCR read errors as illustrated in Example 4.

$^T_O$m Wr$_O$te $^T$his $^T$ext $_O$n $^T$uesday   Example 4

In another example, a pre-printed form is completed using a typewriter which may employ a different font, font size, font style and/or paper alignment from the pre-printed form, causing misalignment as illustrated in Example 5.

| Patient Name: | Bill Davidson |

Example 5

In yet another example, a table or spreadsheet cell containing a single line of text may have the text appear vertically centered with white space above and below the centered text whereas two lines of text within an adjacent table or spreadsheet cell may appear vertically distributed with white space appearing above line one, between lines one and two (in the vertical center of the cell separating the two lines of text), and below line two. Comparing these two cells then shows text in the vertical center of the cell with a single line of text and white space in the vertical center of the cell with two lines of text as in Example 6.

| 3. Thomas Jefferson (1801-1809) | Aaron Burr (1801-1805) George Clinton (1805-1809) |
|---|---|

Example 6

Most legacy and contemporary OCR software programs have difficulties with this non-vertical alignment of text within rasters. Artifacts generated by the OCR software due to this circumstance can include, but not be limited to, mis-read text, double-read text and missing text. This can significantly affect the quality and integrity of the OCR generated output, especially with certain documents such as forms, spreadsheets and tabular data that contain a large occurrence of non-vertically aligned text.

One solution to improving the efficacy of OCR for non-vertically aligned text is to preprocess the image(s) so that text is vertically aligned prior to OCR. An example of this solution is described within commonly assigned U.S. Pat. No. 10,417,516, "System and Method for preprocessing images to improve OCR efficacy", which is hereby incorporated by reference in its entirety.

Despite the existence of such solutions, further advancements in improving the efficacy of OCR for non-aligned text may be desirable in certain applications.

SUMMARY

A method to improve the efficacy of optical character recognition (OCR) is disclosed. The method includes scanning an electronically stored representation of a whole or partial document, identifying an image having text in the electronically stored representation of a whole or partial document, identifying the text identified within the image, and generating a plurality of bounding boxes around the identified text using blob detection. In addition, the method includes grouping together certain identified text of the plurality of identified text whose bounding boxes are vertically aligned with each other to generate a plurality of aligned text, performing OCR on text whose bounding boxes are vertically aligned to generate a plurality of OCR groups of text, generating a resultant representation of a whole or partial document electronically using the plurality of OCR groups of text, and saving the resultant representation of a whole or partial document electronically.

The processor is configured to create one or more images or image layers of identified text whose bounding boxes share similar vertical alignment, where additional identified text is added to that image or image layer having bounding boxes vertically aligned with the additional identified text or, failing to find a suitable image or image layer, to create one or more new images or image layers for the additional identified text. The processor is also configured to OCR the one or more images or image layers of text separately from the other images or image layers to generate the plurality of OCR groups of text.

The processor may also be configured to create an array of one or more groups of identified text whose bounding boxes share similar vertical alignment, where additional identified text is added to that array group having bounding boxes vertically aligned with the additional identified text or, failing to find a suitable array group, to create one or more new array groups for the additional identified text. The processor is configured to OCR the one or more array groups of text separately from the other array groups to generate the plurality of OCR groups of text. The plurality of aligned bounding boxes each includes a top, bottom, left, right and baseline.

In another aspect, a system to increase accuracy of optical character recognition (OCR) software is disclosed. The system includes a processor, and a memory coupled to the processor. The processor is configured to scan an electronically stored representation of a whole or partial document, identify an image having text in the electronically stored representation of a whole or partial document, identify text within the image, and generate a plurality of bounding boxes around the identified text using blob detection. In addition, the processor is configured to group together certain identified text of the plurality of identified text whose bounding boxes are vertically aligned with each other to generate a plurality of aligned text, perform OCR on text whose bounding boxes are vertically aligned to generate a plurality of OCR groups of text, generate a resultant representation of a whole or partial document electronically using the plurality of OCR groups of text, and save the resultant representation of a whole or partial document electronically.

Yet another aspect is directed to a non-transitory processor readable medium for operating a processor to increase accuracy of optical character recognition (OCR) software, and with the non-transitory computer readable medium having a plurality of computer executable instructions to cause the processor coupled to a memory to perform steps as described above.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The method and system described herein address the need for preprocessing images in such a fashion to segment non-vertically aligned text prior to OCR and process these instances separately, thus providing higher quality OCR output. There is also a need to preprocess the image so that unaligned text is scanned and converted separately and implemented either internal to the OCR software or external to the OCR software, the latter eliminating the need for updated OCR software containing this functionality to be developed, thus potentially saving cost and time.

In addition, the method and system of the present invention can be added to current OCR work flows instead of requiring the entire OCR solution to be replaced or upgraded to add this functionality. The method and system also address the need to process the image(s) so that unaligned text is separated and processed as separate OCR zones, thereby using local zonal OCR without the alignment dependencies of non-zonal as described in the current disclosure. The method and system preprocess the image(s) so that unaligned text is separated as separate images, image layers or zones, or similar segmented approach and processed via one or more secondary OCR scans, as described below. In a particular aspect, the method improves the efficacy of raster-based OCR software is disclosed. The method provides for the detection and segmentation of non-vertically aligned text so that non-vertically aligned text can be processed using extra-raster techniques. The method addresses a weakness in contemporary OCR software packages, which are typically based on raster (horizontal) scanning of content along the width of the image and utilize a common baseline for text within the raster. The raster approach may encounter difficulties if the content is not vertically aligned into text rows causing a common baseline for text within the raster to become erroneous or unpredictable for non-vertically aligned text as illustrated by the line of text below.

The $^{quick}$ brown $_{fox}$ jumps $^{over}$ the $_{lazy}$ dog Example 7

In a particular aspect, the method presently disclosed is realized as computerized OCR-management software preferably, but not necessarily, residing on the same computer as the OCR software. The OCR-management software analyzes the OCR source image(s) either singularly or in batch prior to OCR. The OCR-management software detects and manages the separate OCR processing of groups of vertically aligned text within a document potentially containing vertically unaligned text.

Figure 1A:
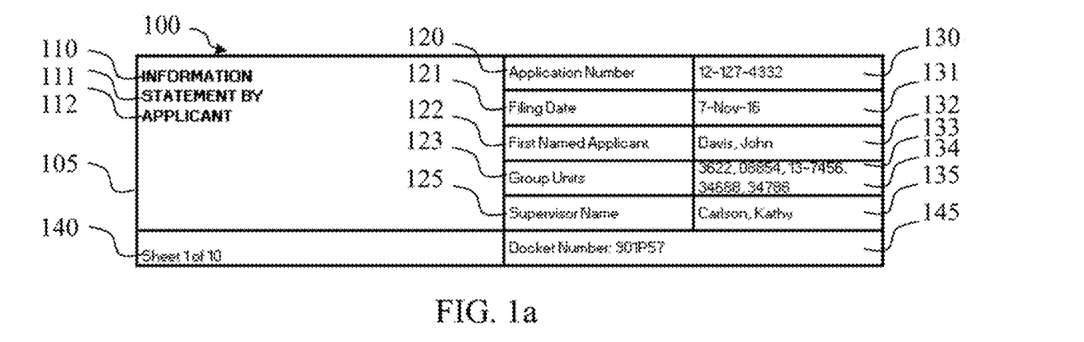
FIGS. 1a, 1b and 1c illustrate a portion of a form document detailing cell boundary lines, aligned text and unaligned text, as well as possible zones for grouping aligned text elements in which various aspects of the disclosure may be implemented.

FIG. 1a is an illustrative example in which various aspects of the disclosure may be implemented, namely the use of algorithmically calculated OCR zones allowing zonal OCR software to process selected zones of the image without regard to the vertical alignment of text sharing the same raster.

Referring to FIG. 1a, an illustrative example of a portion of a form document 100 is shown. The form document 100 includes a plurality of sections containing textual data arranged in cells. A cell may contain a single line of text (120-125, 130-132, 135-145), or multiple lines of text (110-112, 133-134). Additionally, text may be vertically justified as top justified 110, vertical-center justified (120-125, 130-132, 135, 145), bottom justified 140, full justified or some other justification, alignment or combination thereof.

Additionally, the text of the form document 100 may contain text using different fonts, font point sizes, font attributes including, but not limited to, bold, italic, underline, horizontal spacing/kerning and vertical spacing/leading in any combination and which may affect the vertical alignment of text along the width of the image.

Figure 1B:
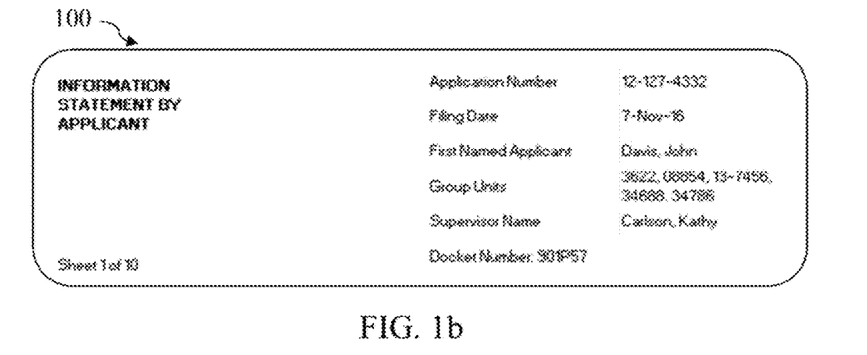

Referring now to FIG. 1b, the cell boundary lines 105 have been algorithmically removed from the form document 100 to facilitate OCR and text alignment detection. The cell boundary line removal process is an optional step of the presently described invention intended to facilitate OCR and improve OCR efficacy.

Figure 1C:
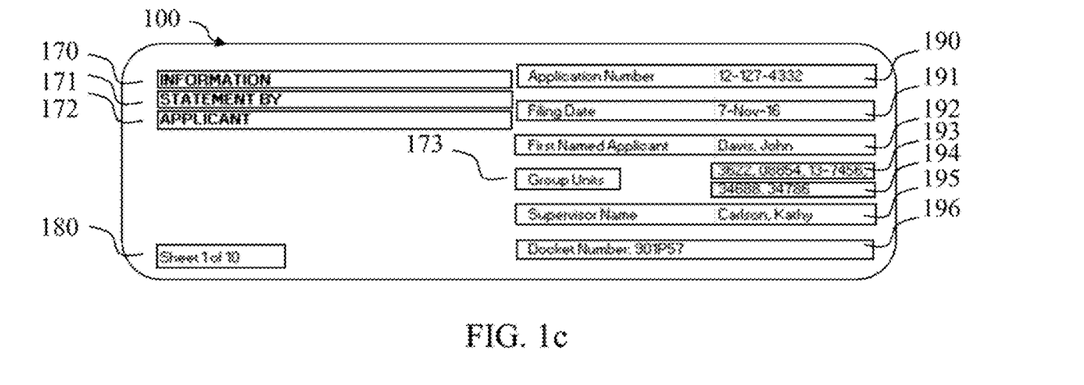

FIG. 1c shows that the cell boundary lines 105 have been algorithmically removed from the form document 100 and notational zone rectangles (170-196) have been added to facilitate visualization of text alignment issues demonstrated by the form document 100, and zonal OCR areas as determined by the text alignment detection algorithms.

Figure 2A:
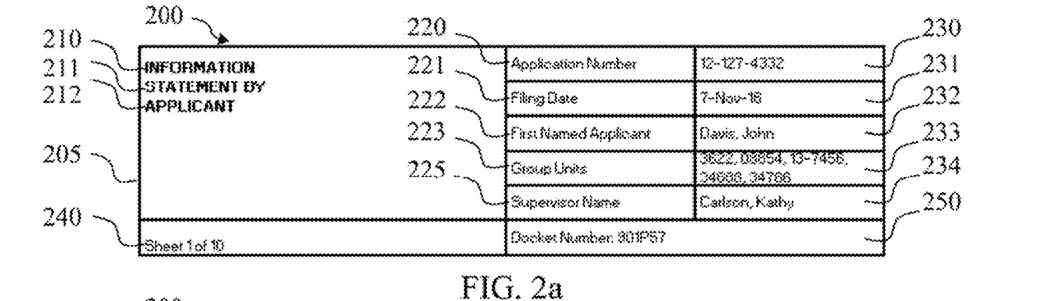
FIGS. 2a, 2b, 2c, and 2d illustrate a portion of a form document detailing line graphics, aligned text and unaligned text, as well as possible image layers or zones to group aligned text elements.

FIG. 2a is an illustrative example in which various aspects of the disclosure may be implemented, namely the use of algorithmically calculated text alignment to separate text into one or more images or image layers or zones allowing non-zonal OCR software to process each resultant image or image layer or zone of aligned text without regard to the vertical alignment of previously-present text sharing the same raster.

Referring to FIG. 2a, an illustrative example of a portion of a form document 200 is shown. The form document 200 includes of a plurality of sections containing textual data arranged in cells. A cell may contain a single line of text (220-225, 230-232, 234-250), or multiple lines of text (210-212, 233). Additionally, text may be vertically justified as top justified 210, vertical-center justified (220-225, 230-232, 234, 250), bottom justified 240, full justified or some other justification, alignment or combination thereof.

Additionally, the text of the form document 200 may contain text using different fonts, font point sizes, font attributes, including, but not limited to, bold, italic, underline, horizontal spacing/kerning and vertical spacing/leading in any combination and which may affect the vertical alignment of text along the width of the image.

Figure 2B:
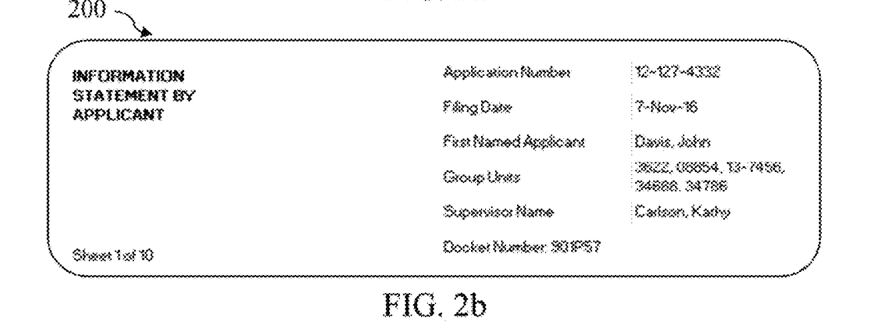

Referring to FIG. 2b, an illustrative example of a portion of the form document 200 is shown where the cell boundary lines 205 have been algorithmically removed to facilitate OCR and text alignment detection. The cell boundary line removal process is an optional step of the presently described invention intended to facilitate OCR and improve OCR efficacy.

Figure 2C:
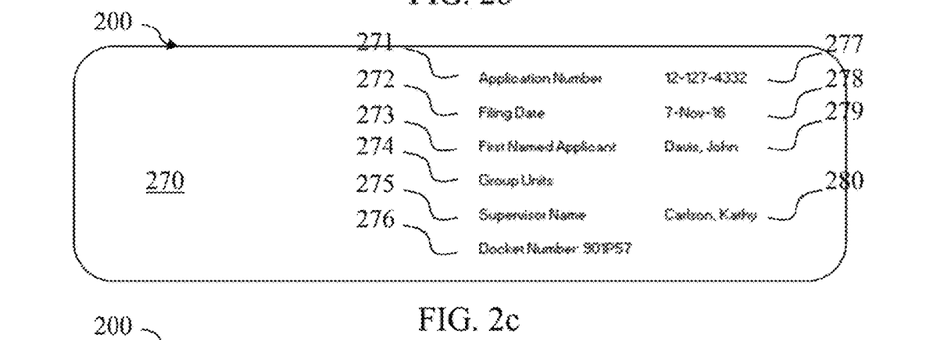

Referring now to FIG. 2c, the form document 200 is shown where the cell boundary lines 205 have been algorithmically removed and text which shares the same vertical alignment are separated into an algorithmically generated first image or first image layer or zone 270. Text 271 and 277 are aligned and are included in the first image or first image layer or zone 270. Similarly, text 272 and 278, text 273 and 279, and text 275 and 280 are aligned and do not interfere with the alignment of other groups and are thusly included in the first image or first image layer or zone 270. The first image or first image layer 270 thus contains the aligned text, possibly occupying multiple lines.

Figure 2D:
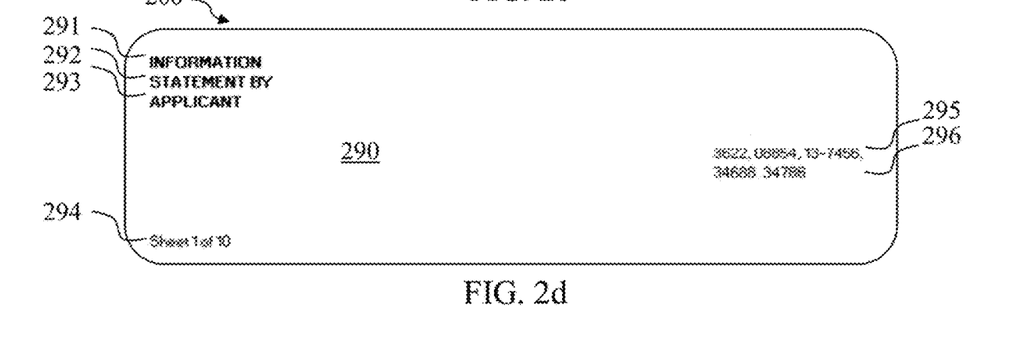

Referring now to FIG. 2d, the form document 200 is shown where the cell boundary lines 205 have been algorithmically removed and text which shares the same vertical alignment are separated into an algorithmically generated second image or second image layer or zone 290. The text on the second image or second image layer or zone 290 is exclusive of the text on the first image or first image layer or zone 270.

Text 291-296 each contains single line text. In each case the text is not vertically aligned with the previously separated text 271-280 and is thus separated into the different image or image layers or zones, for example, first image layer or zone 270 or second image layer or zone 290. In this fashion, OCR software can process each of the algorithmically generated image layers or zones (270 and 290) separately without the adverse effects of non-vertically aligned text but with superior OCR efficacy.

Figure 3A:
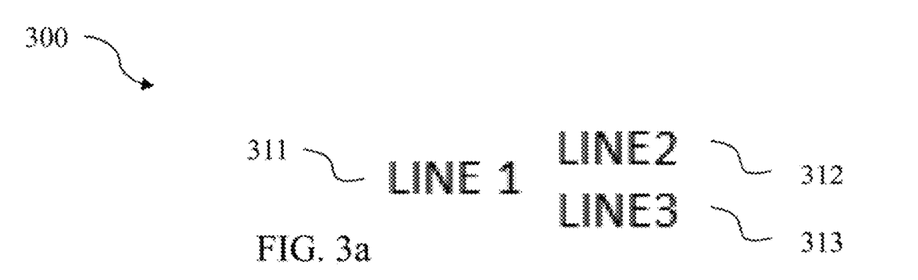
FIGS. 3a, 3b, 3c, 3d, and 3e contain illustrations of how raster scanning can adversely divide text pixels of non-vertically aligned text.
Figure 3B:
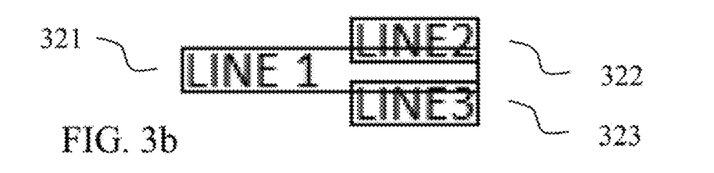

FIG. 3a. illustrates the possible adverse effects of non-vertically aligned text processed by raster-based typical OCR software. For example, three lines of text (311, 312, 313) are presented where text line 311 is not vertically aligned with text lines 312 and 313. In fact, text line 311 is positioned halfway between text lines 312 and 313 in the vertical sense. As OCR software rasterizes an image in preparation for OCR, it typically calculates bounding boxes for the text in each line. These calculated bounding boxes are shown in FIG. 3b as the boxes 321, 322 and 323 encompassing text lines 311, 312 and 313, respectively. Since text line 311 is not vertically aligned, its corresponding calculated bounding box 321 intersects those of text lines 312 and 313, bisecting the text characters and their bounding boxes 322 and 323.

Figure 3C:
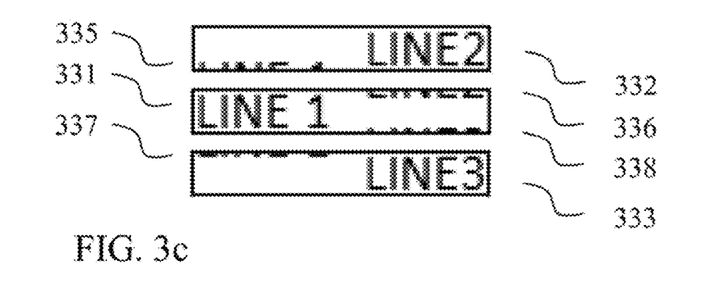

Calculated bounding boxes 321, 322 and 323 encompassing text lines 311, 312 and 313, respectively, are redrawn in FIG. 3c as calculated bounding boxes 331, 332 and 333, respectively, with illustrative spacing added to graphically differentiate the text rasterization process used by typical OCR software. The calculated bounding boxes 331, 332 and 333 around text lines 311, 312 and 313, respectively, are elongated to more accurately depict the full width raster scan process used by typical OCR software. In this case, it is shown how portions of text lines 311 and 312 are included in the calculated bounding boxes 331 and 332 resulting in artifacts 335 and 336, respectively. Additionally, portions of text lines 311 and 313 are included in calculated bounding boxes 331 and 333 resulting in artifacts 337 and 338, respectively.

A cause of OCR errors due to non-vertically aligned text involves the possibility of typical OCR software skipping a non-vertically aligned text line. In this case, once typical OCR software would raster and calculate the bounding box for a previous text line (e.g., 332), typical OCR software automatically advances past the next region of vertical white space/leading before rasterizing subsequent scans. In this example, typical OCR software with this attribute would advance from text line 312 past the bottom of collective bounding box 331 before encountering a raster of non-text white space/leading before resuming OCR and thusly potentially skip text lines 311 and 313 completely.

Another cause of OCR errors due to non-vertically aligned text involves the presence of artifacts 335-338 within the calculated bounding boxes of adjacent text lines. In this case, the extraneous partial text characters could potentially be misconstrued as 1) punctuation or other character data leading to inserted fictitious characters, or 2) unrecognized text data leading to OCR confidence errors or unidentified character marks ("?"). For example, artifact 338 viewed from the viewpoint of bounding box 331 might be misconstrued as four periods, an underscore, a space and a comma (...._ ,) by typical OCR software.

Figure 3D:
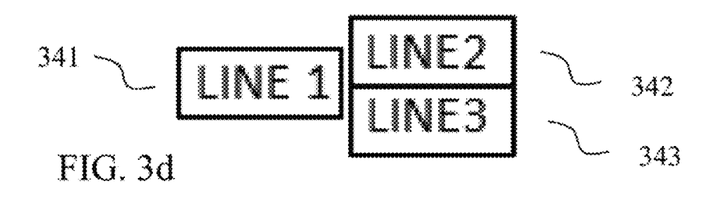

Referring now to FIG. 3d, the original text lines 311-313 are contained within calculated bounding boxes 341-343 where each text line 311-313 has been contained within their own bounding boxes (341-343) allowing zonal OCR software to convert the text with improved efficacy.

Figure 3E:
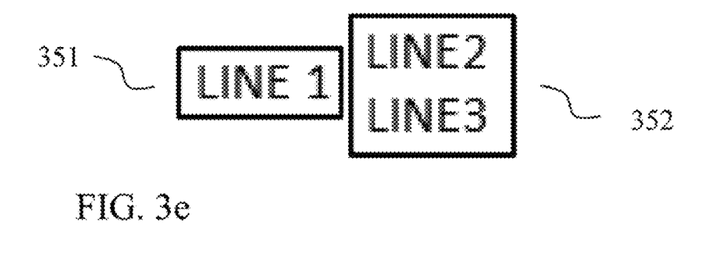

Alternately, as shown in FIG. 3e, the original text lines 311-313 are contained within calculated bounding boxes 351 and 352 where text line 311 has been contained within its own bounding box 351 and text lines 312 and 313 have been contained within a single bounding box 352 allowing zonal OCR software to convert the text with improved efficacy.

Figure 4A:
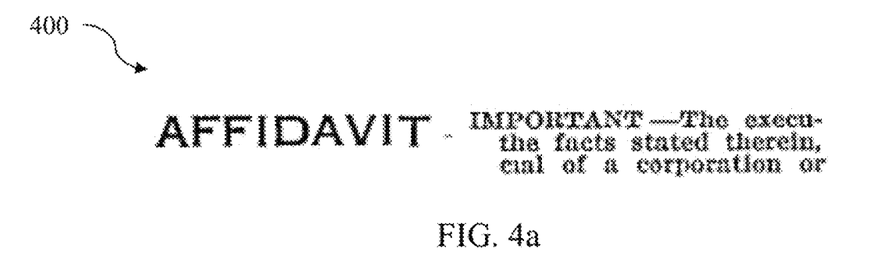
FIGS. 4a, 4b, 4c, and 4d illustrate blob detection techniques for defining text boundaries for the purpose of determining text alignment.

Referring now to FIG. 4a, an example of non-vertically aligned text due to varying font sizes is presented. Image 400 depicts the original image before analysis.

Figure 4B:
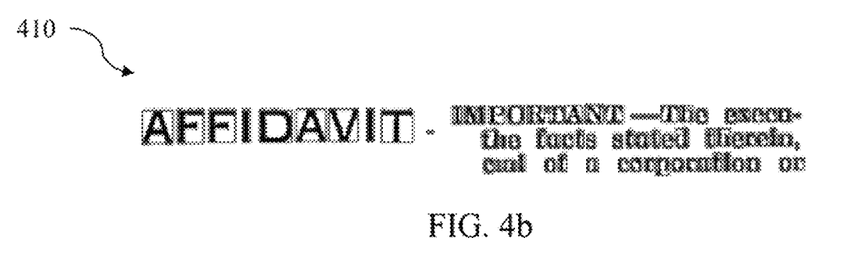

Image 410 of FIG. 4b displays the same image after a Blob Detection algorithm has detected the text characters within the image and outlined each text character with a bounding box indicative of that text character's top, bottom, left and right boundaries. Blob Detection algorithms are commonly used image processing algorithms known to those skilled in the art of the field of the presently described invention.

Figure 4C:
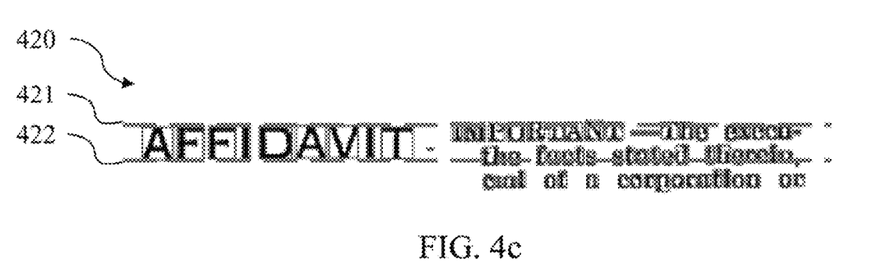

Referring now to FIG. 4c, image 420 displays the same image with 2 dotted lines (421, 422) demarking the top and bottom of the text on the left of the image. Extending dotted lines 421 and 422 to the right demonstrates the non-vertical alignment with the text on the right of the image.

Figure 4D:
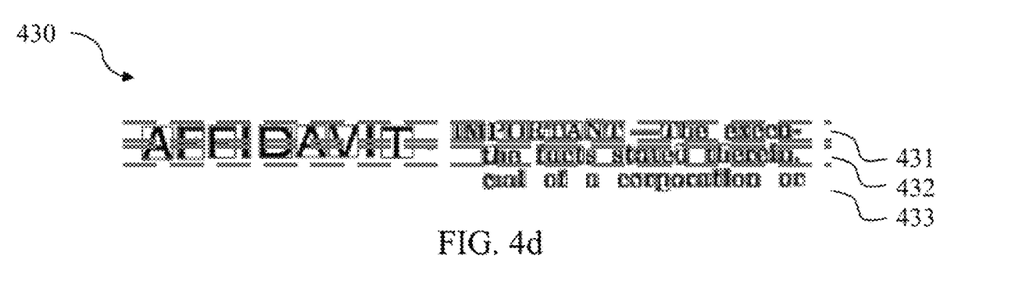

Similarly, image 430 of FIG. 4d, displays the same image with 2 sets of dotted lines (431, 432) demarking the top and bottoms of the two upper text lines on the right of the image. Extending dotted lines 431 and 432 to the left illustrates the non-vertical alignment with the text on the left of the image. Text line 433 does not exhibit non-vertical alignment with adjacent text.

Figure 5:
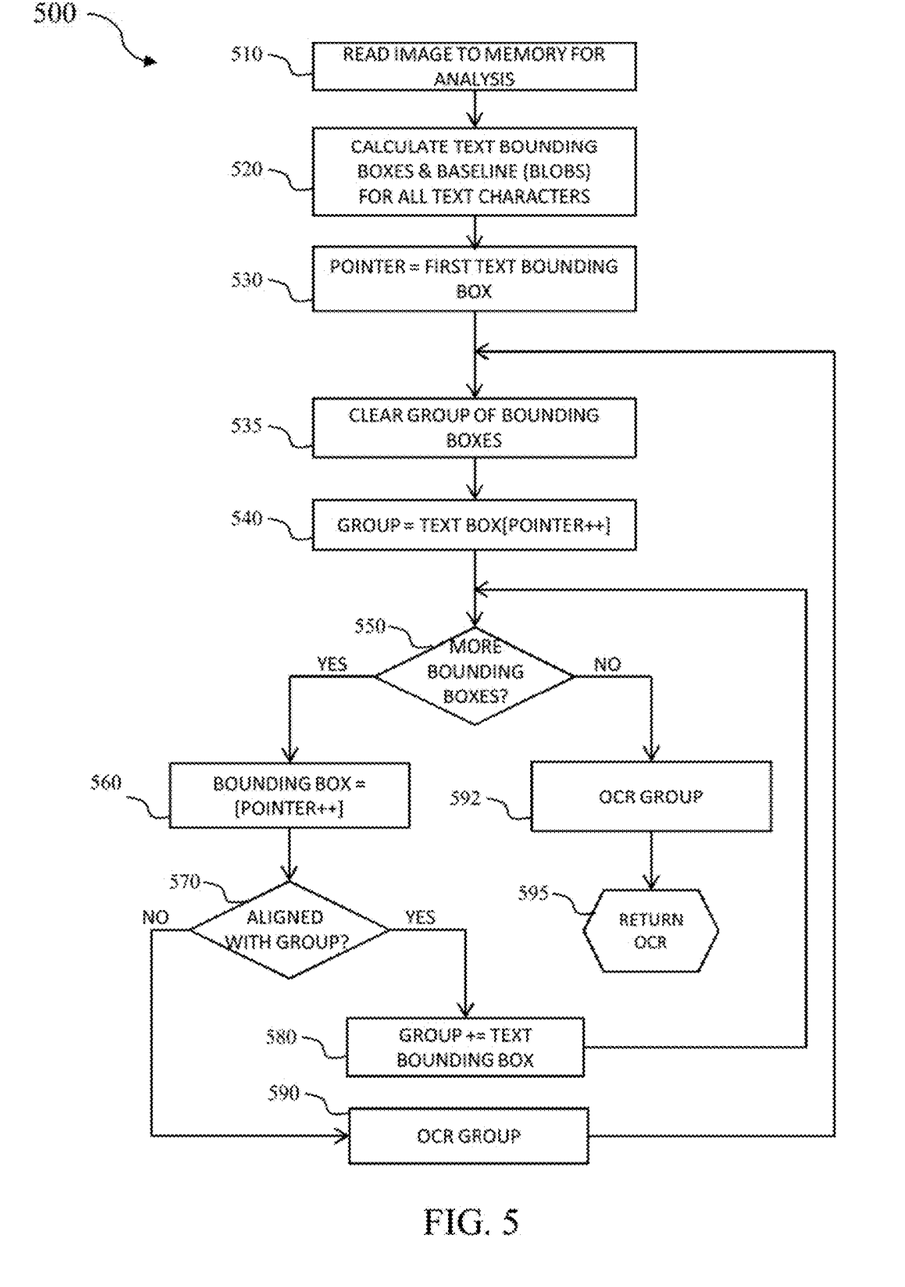
FIG. 5 is an illustration of a process flow chart of an approach for grouping text in terms of vertical alignment, in which various aspects of the disclosure may be implemented.

Referring now to FIG. 5, a block diagram 500 of a method for improving the efficacy of OCR is illustrated in which various aspects of the disclosure may be implemented. The process begins, at 510, with the typically automated input of the image file(s) in need of pre-processing. This step typically leverages a mechanism for designating which file or files are in need of processing such as, but not limited to, specifying files using a Graphical User Interface (GUI) dialog box based file selector, specifying files listed in a secondary file (e.g., .BAT, .TXT, .XML), specifying files programmatically contained in an array of filenames, specifying memory streams, employing file drag-and-drop from the desktop, and storing files in an Inbox folder or specified directory of images to process. Regardless of the image selection mechanism, step 510 will sequentially read each image (or in parallel using Pipelining, Threading, Parallel Processing or similar programming techniques) and store the contents programmatically in a readily accessible and malleable format such as in a memory array for pre-processing.

Processing of the image begins, at 520, with the detection and processing of calculated bounding boxes for each text character in the input image. Text characters can be located by a variety of known and well-developed, well-documented algorithms which would be familiar to those knowledgeable in the art such as Blob Detection. The calculated bounding box for the text character includes top, bottom, left, right and baseline of the text character. These bounding box results are stored in an array, list or other data structure for processing.

Moving to 530, a loop begins to traverse all text character bounding boxes (rectangles) contained within the image, and, at 535, the method initiates an array, list or other data structure, comprising a group of zero, one or more text character bounding boxes having similar vertical alignment, with zero items (cleared).

The bounding box of the current text character is added, at 540, to the group array, list or other data structure. This step also increments the pointer to the next text character's bounding box and, at 550, the method checks for the end of the text characters. If more text characters exist, the next text character's bounding box is retrieved and the pointer is incremented, at 560. If no additional text characters exist, the last group of text characters are subject to OCR, at 592, and the results of all OCR is returned, at 595.

When the next text character is retrieved at 560, then at 570, the method compares the vertical alignment of the new text character's bounding box with that of the group of text bounding boxes assembled at 540. If the current text character is aligned with the group, the method, at 580, will add the text character's bounding box to the group and then loop back to the done check, at step 550.

If the alignment check 570 determines the current text character is not aligned to the group, the group is OCR, at 590 and execution loops back to 530, which clears the group array, list or other data structure and adds the current text character's bounding box to the freshly cleared group, at 540.

Figure 6:
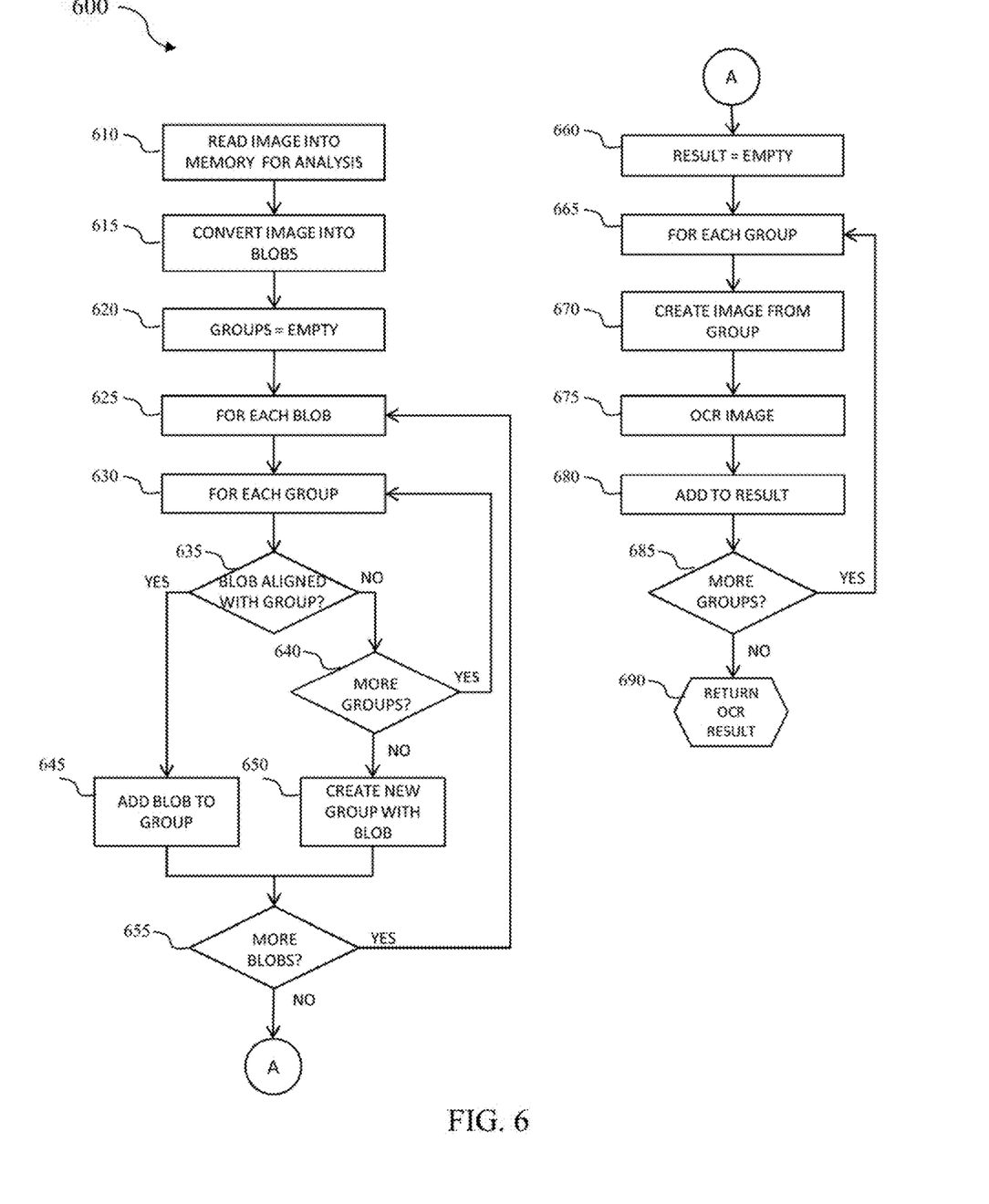
FIG. 6 is a flow diagram of a particular embodiment of a method for improving the efficacy of OCR by vertically aligning row-based text during image preprocessing, in which various aspects of the disclosure may be implemented.

Referring now to FIG. 6, a block diagram of another aspect of a method 600 for improving the efficacy of OCR is illustrated. At 610, the method begins with the image selected for OCR being read into memory for analysis. Moving to 615, an array, list or other data structure is created from the blobs contained in the image read at 610. These blobs represent the text characters comprising the image at 610.

The method 600 includes, at 620, that an array, list or other data structure is created and initialized. The array, list or other data structure containing the blobs comprising the image at 620 is traversed, at 625. The array, list or other data structure containing the groups of aligned blobs is traversed, at 630.

Moving to 635, the method checks if the current blob from step 625 shares a common vertical alignment with the current group from step 630. If the current blob is not vertically aligned with members within the current group, execution continues, at 640. The method checks, at 640, if there are more groups to traverse in the array, list or other data structure created, at 620. If there are more groups to traverse, execution resumes, at 630. Otherwise, the blob will be included within a new group of blobs, at 650.

The method also includes that step 650 is invoked for a blob which is not already vertically aligned to members within an existing group. Step 650 creates a new group with the blob as its first member. Step 645 is invoked for a blob which is in alignment with members of an existing group. Step 645 adds the blob to the group. The method includes, at 655, to check if there are more blobs to process. If there are, the method will loop back to step 625. Otherwise, execution continues to step 660.

Moving to 660, the method includes initializing the OCR results and clearing the contents. A loop to process each of the aforementioned groups of blobs sharing the same vertical alignment begins, at 665. The method includes, at 670, creating an image layer or zone from the current group. One aspect of doing so is to copy the pixel data from each blob in the current group into the new image layer or zone.

The method includes, at 675, to OCR the image layer or zone created, at 670. In addition, the method adds the OCR results, at 680, to the result initialized, at 660, and checks, at 685, if more groups are needed to be processed and the method will loop back to step 665 if there are more in need of processing. Otherwise, at 690, the method will return the result of the OCR of the image layer(s) or zone(s). For the OCR result to be recognizable, the results are ordered in the same position and sequence as the initial blobs.

Figure 7:
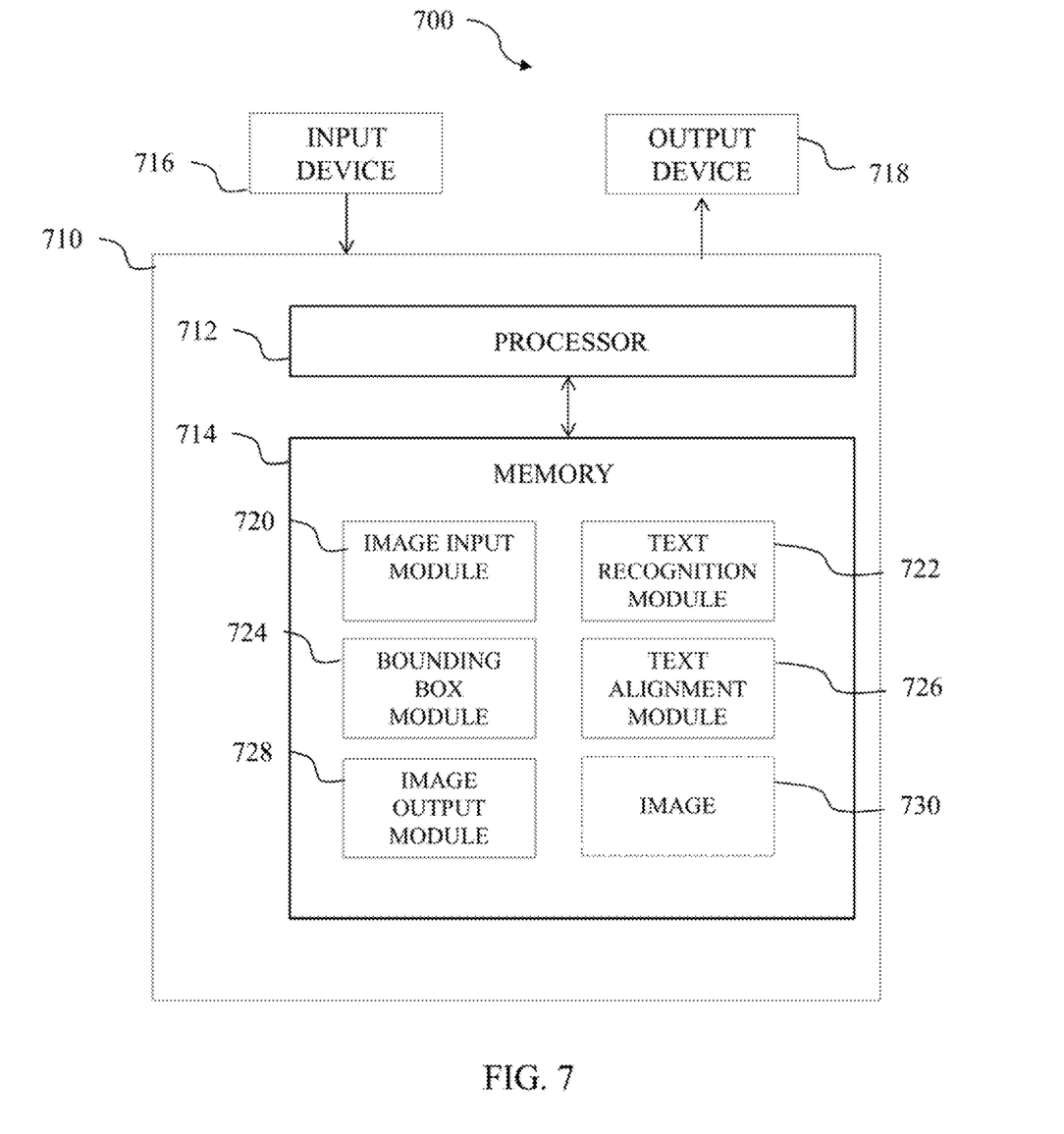
FIG. 7 is a block diagram of a particular illustrative embodiment of a method for improving the efficacy of OCR by vertically aligning row-based text during image preprocessing, according to an embodiment of the present invention.

Referring now to FIG. 7, a particular illustrative embodiment of a system to implement the methods described above and improve the efficacy of OCR by vertically aligning row-based text is depicted and generally designated 700. The system 700 includes a processor 712 that is communication with an input device 716, where a memory 714 of a computer or server 710 may be adapted to store content of an electronic document 730. In a particular illustrative embodiment, the content of the electronic document 730 may include non-vertically aligned text. An image input module 720 may be used to input the at least one electronically stored document 730, a text recognition module 722 may be used to identify at least one textual object within the document 730, bounding box module 724 may be used to isolate the at least one textual object to generate a calculated bounding box of the at least one textual object, a text alignment module 726 may be used to align the at least one textual object to adjacent textual objects, and an image output module 728 may be used to save the results of the textual alignment to the output device 718 for later processing by external OCR software.

The modules 720, 722, 724, 726 and 728 may be implemented in hardware, firmware, software, other programmable logic, or any combination thereof. The memory 714 includes media that is readable by the processor 712 and that stores data and program instructions of the software modules 720, 722, 724, 726 and 728 that are executable by the processor 712. Additionally, the input device 716 may be a keyboard, mouse, light pen, track ball, track pad, joystick, graphics tablet, touch screen, or other pointing device, or memory or image storage device, or any combination thereof that is accessible to the processor 712. Additionally, the system 700 may include a display, for example, a cathode ray tube (CRT) display, liquid crystal display (LCD), light emitting diode (LED) display, plasma display, or other display device that is accessible to the processor 712 to display the electronic image 730 to a user.

Figure 8:
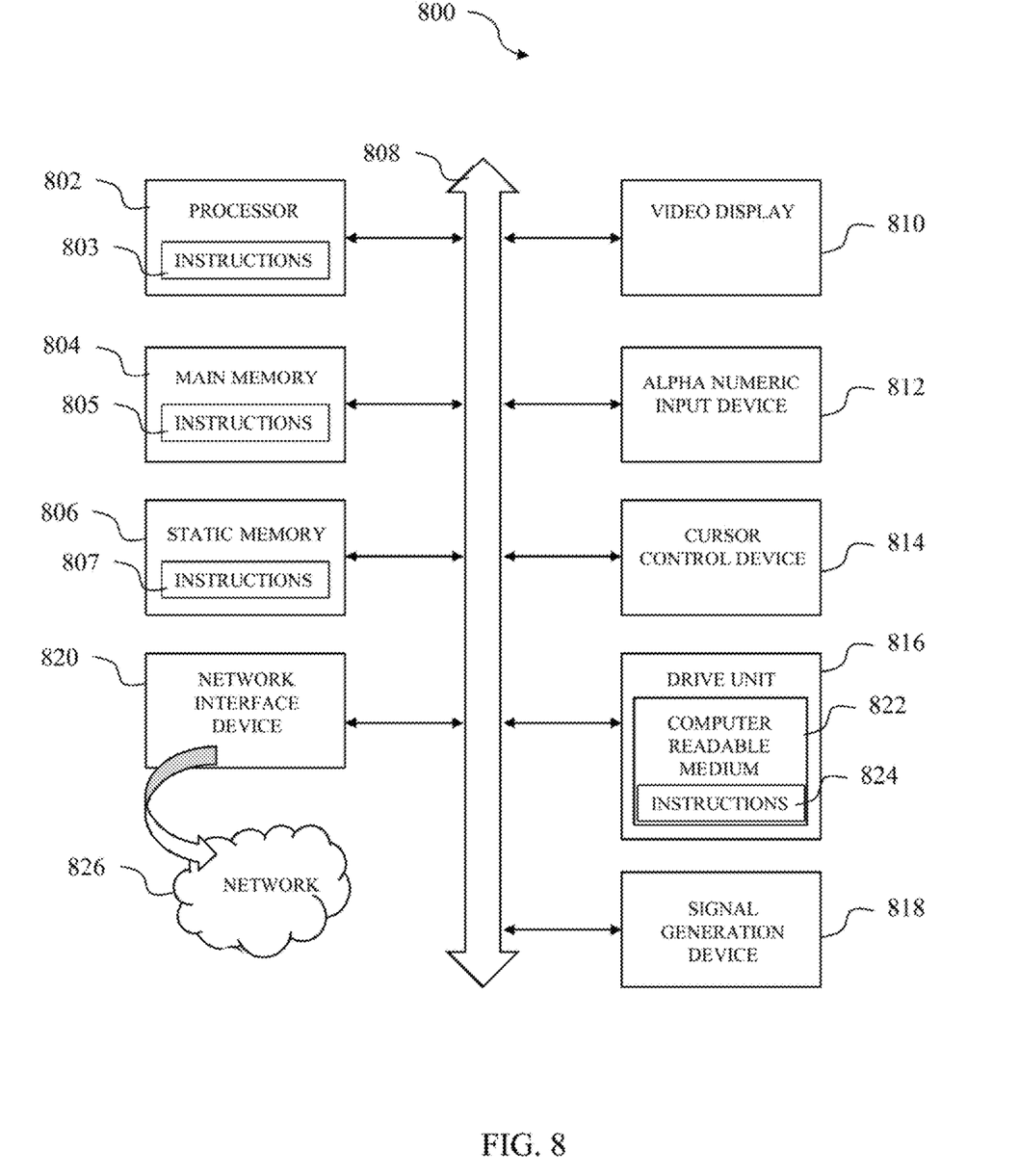
FIG. 8 is a diagram of a general computer system.

Referring now to FIG. 8, an illustrative embodiment of a general computer system is shown and is designated 800. The computer system 800 can include a set of instructions that can be executed to cause the computer system 800 to perform any one or more of the methods or computer-based functions disclosed herein. The computer system 800, or any portion thereof, may operate as a standalone device or may be connected, e.g., using a network, to other computer systems or peripheral devices.

In a networked deployment, the computer system 800 may operate in the capacity of a server, such as a video server or application server, or a media device. The computer system 800 can also be implemented as or incorporated into various devices, such as a personal computer (PC), a personal digital assistant (PDA), a mobile device, a palmtop computer, a laptop computer, a desktop computer, a communications device, a wireless telephone, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics-processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), a flat panel display, a solid-state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g., software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

The steps of a method or algorithm described in connection with the embodiments disclosed herein may be embodied directly in hardware, in a software module executed by a digital signal processor, microprocessor, or in any combination thereof. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

That which is claimed is:

1. A system to increase accuracy of optical character recognition (OCR) software, the system comprising:
   a processor; and
   a memory coupled to the processor, the processor configured to
      scan an electronically stored representation of a whole or partial document;
      identify an image having text in the electronically stored representation of a whole or partial document;
      identify text within the image;
      generate a plurality of bounding boxes around the identified text using blob detection;
      group together certain identified text of the plurality of identified text whose bounding boxes are vertically aligned with each other to generate a plurality of aligned text;
      perform OCR on text whose bounding boxes are vertically aligned to generate a plurality of OCR groups of text;
      generate a resultant representation of a whole or partial document electronically using the plurality of OCR groups of text; and
      save the resultant representation of a whole or partial document electronically;
      wherein the processor is configured to create one or more images or image layers of identified text whose bounding boxes are vertically aligned; and
      wherein additional identified text is added to the image or image layer having bounding boxes vertically aligned with the identified text or, failing to find a suitable image or image layer, to create one or more new images or image layers for the additional identified text.

2. The system of claim 1, wherein the processor is configured to OCR the one or more images or image layers of text separately from the other images or image layers to generate the plurality of OCR groups of text.

3. The system of claim 1, wherein the processor is configured to create an array of one or more groups of identified text whose bounding boxes are vertically aligned.

4. The system of claim 3, wherein additional identified text is added to the array group having bounding boxes vertically aligned with the additional identified text or, failing to find a suitable array group, to create one or more new array groups for the additional identified text.

5. The system of claim 4, wherein the processor is configured to OCR the one or more array groups of text separately from the one or more new array groups to generate the plurality of OCR groups of text.

6. The system of claim 1, wherein the plurality of aligned bounding boxes each includes a top, bottom, left, right and baseline.

7. A non-transitory processor readable medium for operating a processor to increase accuracy of optical character recognition (OCR) software, and with the non-transitory computer readable medium having a plurality of computer executable instructions to cause the processor coupled to a memory to:
   scan an electronically stored representation of a whole or partial document;
   identify an image having text in the electronically stored representation of a whole or partial document;
   identify text identified within the image;
   generate a plurality of bounding boxes around the identified text using blob detection;
   group together certain identified text of the plurality of identified text whose bounding boxes are vertically aligned with each other to generate a plurality of aligned text;
   perform OCR on text whose bounding boxes are vertically aligned to generate a plurality of OCR groups of text;
   generate a resultant representation of a whole or partial document electronically using the plurality of OCR groups of text; and
   save the resultant representation of a whole or partial document electronically;

wherein the processor is configured to create one or more images or image layers of identified text whose bounding boxes share similar vertical alignment; and wherein additional identified text is added to that image or image layer having bounding boxes vertically aligned with the additional identified text or, failing to find a suitable image or image layer, to create one or more new images or image layers for the additional identified text.

8. The non-transitory computer readable medium of claim 7, wherein the processor is configured to OCR the one or more images or image layers of text separately from the other images or image layers to generate the plurality of OCR groups of text.

9. The non-transitory computer readable medium of claim 7, wherein the processor is configured to create an array of one or more groups of identified text whose bounding boxes share similar vertical alignment.

10. The non-transitory computer readable medium of claim 9, wherein additional identified text is added to that array group having bounding boxes vertically aligned with the additional identified text or, failing to find a suitable array group, to create one or more new array groups for the additional identified text.

11. The non-transitory computer readable medium of claim 10, wherein the processor is configured to OCR the one or more array groups of text separately form the other array groups to generate the plurality of OCR groups of text.

12. The non-transitory computer readable medium of claim 7, wherein the plurality of aligned bounding boxes each includes a top, bottom, left, right and baseline.

\* \* \* \* \*